United States Patent [19]

Penitot et al.

[11] Patent Number: 5,007,447
[45] Date of Patent: Apr. 16, 1991

[54] PNEUMATIC FEED SAFETY APPARATUS WITH RE-SETTING CONTROL

[75] Inventors: Gérard Penitot, Paris; Marcel Cartigny, Neuilly-sur-Marne; Joël Roynard, Villeneuve-le-Comte; Bruno Valdenaire, Le Raincy; Marc Astier, Montrouge; Bernard Mery, Cachan; Michael Wendling, Strasbourg, all of France

[73] Assignee: Quiet S.A., Chelles, France

[21] Appl. No.: 478,693

[22] Filed: Feb. 12, 1990

[30] Foreign Application Priority Data

Feb. 13, 1989 [FR] France .................................. 89 01845

[51] Int. Cl.$^5$ ........................ F16K 17/02; F16K 37/00
[52] U.S. Cl. ..................................... 137/102; 137/269; 137/556; 137/557; 137/625.27
[58] Field of Search ........ 137/102, 107, 269, 456, 137/524, 556, 557, 624.27, 625.27; 251/337

[56] References Cited

U.S. PATENT DOCUMENTS

| | | |
|---|---|---|
| 2,638,108 | 5/1953 | Williams et al. ................... 137/102 |
| 3,166,358 | 1/1965 | Valentine .................. 137/625.27 X |
| 3,610,284 | 10/1971 | Spencer . | 
| 3,769,996 | 11/1973 | Holbrook et al. .................. 137/102 |
| 3,818,943 | 6/1974 | Bouteille ..................... 137/625.66 |
| 3,820,567 | 6/1974 | Bouteille ..................... 137/625.66 |
| 4,004,610 | 1/1977 | Theriot . |
| 4,508,014 | 4/1985 | Shoff .......................... 137/596.17 X |

FOREIGN PATENT DOCUMENTS

| | | |
|---|---|---|
| 1038859 | 9/1958 | Fed. Rep. of Germany . |
| 1152856 | 8/1963 | Fed. Rep. of Germany . |
| 1220183 | 6/1966 | Fed. Rep. of Germany ...... 137/524 |
| 138694 | 2/1920 | United Kingdom ............... 137/524 |
| 2074701 | 11/1981 | United Kingdom ............... 137/524 |

*Primary Examiner*—Gerald A. Michalsky
*Attorney, Agent, or Firm*—Griffin, Branigan & Butler

[57] ABSTRACT

A re-settable apparatus for producing a signal for triggering off a safety measure on an installation with at least a pneumatic feed in response to a drop in the pneumatic feed pressure comprises a body providing an internal chamber connected by a first duct to a first orifice for connection thereof to the pneumatic feed, by a second duct to at least one member for outputting a signal for control of the triggering effect, and by a third duct to an exhaust orifice. The first duct opens into the chamber through a first seat and the third duct opens into the chamber through a second seat of larger diameter than the first seat. A valve member is mounted in the chamber movably between a first position in which it is applied against the first seat and a second position in which it is applied against the second seat, while a resilient return member between the body and the valve member urges the valve member towards its first position with a force of given intensity. A voluntary re-setting control arrangement comprises a thrust member disposed in opposite relationship to the resilient return member with respect to the valve member between the latter and an actuating member which is accessible from the exterior of the body, the thrust member being displaceable in the body with a movement of an amplitude which is at least equal to the value of the displacement of the valve member when it moves from one of the seats to the other.

13 Claims, 5 Drawing Sheets

PNEUMATIC FEED SAFETY APPARATUS WITH RE-SETTING CONTROL

BACKGROUND OF THE INVENTION

The present invention concerns an apparatus for monitoring the pressure obtaining in a compressed air line of an installation comprising in particular components which are actuated pneumatically and possibly components which are fed by other forms of energy, for triggering off a safety operation (for example cutting off a feed) in respect of that installation if the pressure being monitored falls below a certain threshold which is defined by the user of the line in dependence on the safety factor that he intends to provide.

Safety regulations and practice in regard to construction and operation of automatic machines require that, after an interruption in the supply of energy, whether it is electrical or pneumatic, starting a machine again is the subject of a voluntary and deliberate action. Moreover a drop in pressure in a feed line to an installation may result in defective operation of some machines (poor feed in respect of the tools, carrier members, transfer members and the like), which can even be dangerous from the point of view of the operating personnel.

It is therefore important to be able to cut off the feed to an installation in the event of a drop in pressure below a given threshold, and it is also important for that interruption in the feed to be maintained, in spite of the pressure rising again, until an operator performs a deliberate action.

There are pneumatic threshold valves which cut off the intake of fluid under pressure when the pressure falls for example below two bars and which have to be brought into operation again by a manual re-arming step. The pressure threshold in those apparatuses is generally not adjustable and structurally the exhaust is limited in respect of section so that the operation of purging the installation, after an interruption has occurred, is a long one. In addition, their present design is poorly suited to the variation in needs and to the requirements in respect of reliable operation. Also known are manostats which, at a given adjustable pressure threshold, supply an electrical signal which on the one hand may be used on some component of the machine and which on the other hand can feed an electrically operated valve which provides for pilot control of a valve for controlling all or part of the compressed air feed circuit. That assembly involves a high level of cost and is laborious to install. In addition its level of reliability is open to criticism because of the different conversions of pneumatic parameters into electrical parameters and vice-versa.

SUMMARY OF THE INVENTION

An object of the present invention is to remedy those disadvantages of the prior art by proposing an economic construction which is simple to carry into effect.

Another object of the invention is to provide a pneumatic relay with an adjustable triggering threshold and with voluntary re-arming, being capable of outputting a fault signal, the nature of which can be adapted to operating systems ranging from the simplest kind (pilot control of a cut-off valve) or of the most complex kind (programmable automatic apparatus for managing the procedures involved in bringing an installation into and out of operation).

Still another object of the invention is to provide a safety apparatus capable of producing a pneumatic, electrical, or pneumatic and electrical output signal for initiating a safety procedure, which can operate in a positive safety or fail-safe mode to output a signal when the safety apparatus is not working, the absence of output signal making it possible to engage the means for safeguarding the installation such as pneumatic and/or electrical feed cut-off means, means for triggering off alarms or other means specific to the installation.

These and other objects are attained according to the invention by an apparatus with re-arming for producing a signal adapted to trigger off at least one safety measure on an installation including at least a pneumatic feed in the event of a drop in the pressure of said pneumatic feed, comprising, in a body, an internal chamber connected by a first duct to a first orifice for connection thereof to the pneumatic feed, means connected to said chamber for establishing a signal in a first state when the pressure of the feed is higher than a given threshold and in a second state when said pressure falls and passes said threshold, and means for regulating the value of said threshold. More precisely, in accordance with the invention, the signal is, in its first state, the presence of a pressure in a second duct connected to the chamber and, in its second state, the absence of pressure in said second duct, and the means for establishing the signal comprise a first seat through which the first duct opens into the chamber, a third duct connecting the chamber to an exhaust orifice and opening into the chamber through a second seat of larger diameter than the first seat, a valve member mounted in the chamber movably between a first position in which it is applied against the first seat and a second position in which it is applied against the second seat, and a resilient return member disposed between the body and the valve member, the effect thereof tending to return the valve member into its first position under a force of given intensity corresponding to said threshold, and the apparatus further comprises a voluntary re-arming member comprising a thrust member disposed in opposite relationship to the resilient return member with respect to the valve member between the latter and an actuating member which is accessible from the exterior of the body, the thrust member being displaceable in said body with a movement of an amplitude which is at least equal to the value of the displacement of the valve member when it goes from one of the seats to the other.

In accordance with a first embodiment the member for emitting the working signal is formed by a connecting orifice of a conduit connecting the second duct to the member for triggering off the safety measure.

In a second embodiment the member for producing the signal is sensor which is responsive to the pressure obtaining in the second duct and which outputs an electrical signal in the presence of said pressure, towards the member or the system for triggering off the safety measures and, if appropriate, for managing the operating procedures which then follow.

In a third alternative embodiment the apparatus comprises the two members and can therefore output an electrical or a pneumatic signal.

The invention will be better appreciated by reference to the following description of a number of embodiments of the manostatic relay, which is set forth by way of example for illustrating the further features and advantages thereof.

DESCRIPTION OF PREFERRED EMBODIMENTS

Figure 1:
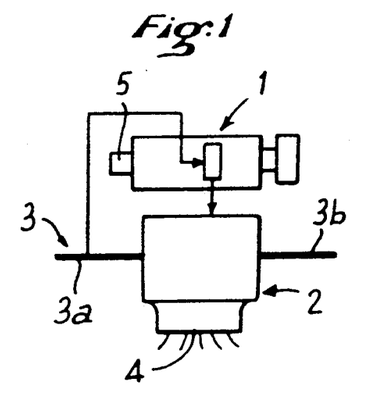
FIGS. 1 through 3 illustrate examples of the field of use of the apparatus according to the invention.
Figure 2:
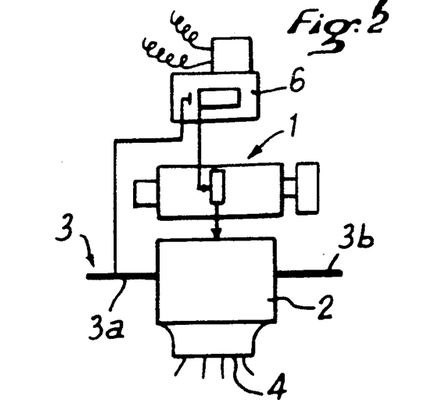
Figure 3:
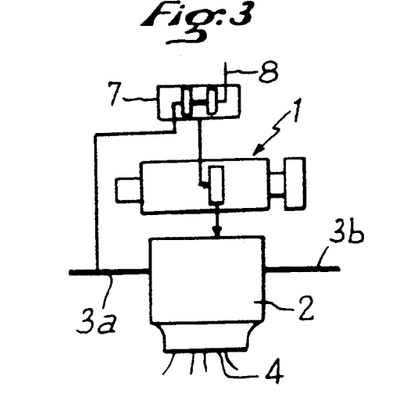

Referring firstly to FIGS. 1 through 3, shown therein are diagrammatic views in which the apparatus 1 according to the invention is associated with a cut-off or disconnection valve 2 for cutting off a conduit 3 for supplying fluid under pressure such as compressed air to an installation, for example a machine, which is not shown herein. The conduit 3 therefore comprises a conduit portion 3a which is disposed upstream of the valve 2, and a conduit portion 3b which is disposed downstream of the valve 2. The conduit portions 3a and 3b are connected when the valve is held in an open condition and they are isolated from each other when the valve is closed, the conduit portion 3b then being connected to the exhaust 4 for purging the installation. The valve 2 is the symbol of a member for triggering off a safety measure (in this case, cutting off or interrupting the pneumatic feed line). The invention is applied to any apparatus for triggering off a safety measure, to which the output signal of the apparatus 1 is directed, whether it is electrical or pneumatic, while the safety measures may be an electrical cut-off or disconnection action, an alarm, the lowering of a barrier, guard or cover, or the like.

In FIG. 1 the valve 2 is only pilot-controlled by the apparatus according to the invention, which monitors the pressure in the upstream conduit portion 3a and, by means of a pilot-control action, holds the valve 2 in an open condition as long as the pressure is higher than a set threshold. The pilot-control signal may be electrical or pneumatic depending on whether the valve 2 does or does not have an associated electrically operated pilot-control valve. If the above-mentioned pressure falls below the threshold specified, the apparatus 1 switches over or changes its state and the valve 2 is no longer pilot-controlled and thus closes, thereby communicating the conduit portion 3b with the exhaust. Irrespective of the value of the pressure in the conduit portion 3a, the apparatus 1 will remain in a switched-over condition and the valve 2 will remain closed. Opening of the valve 2 may occur only after re-arming or re-setting of the apparatus 1 by means of a voluntary and deliberate action on the actuating members 5 of the re-arming or re-setting means. It will be seen hereinafter that that voluntary deliberate action may be manual directly or by way of a pilot-control signal, emitted manually or by means of a data processing system for managing the bringing of the valve into and out of operation.

FIG. 2 shows a cut-off or disconnection valve 2 which reacts in a closure mode in dependence on the one hand in a drop in upstream pressure, as in FIG. 1, and on the other hand, in the event of detection of any fault or failure which produces a cut-off signal, which in this case is electrical, acting on an electrically operated safety valve 6 disposed on the conduit connecting the apparatus 1 and the conduit portion 3a. It will be appreciated that, even after the cut-off signal has disappeared at the electrically operated valve 6, the apparatus 1 has to be re-armed or re-set in order to open the valve 2.

In FIG. 3 the valve 2 is associated with the apparatus 1 and a pneumatic AND operating member 7 which receives on the one hand the pressure in the conduit portion 3a and on the other hand a pneumatic pilot-control or reference signal 8 and which supplies the apparatus 1 with the weakest signal when the two inputs are present. It will be seen that in that way the apparatus 1 can react in a cut-off mode if the signal that it receives is below its regulating threshold.

Figure 4:
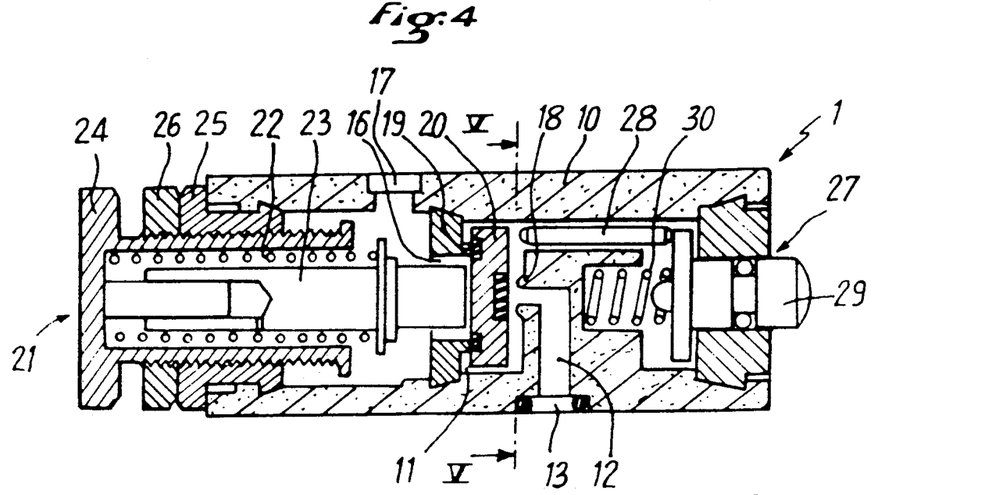
FIG. 4 is a view in longitudinal section of a first embodiment of the invention.
Figure 5:
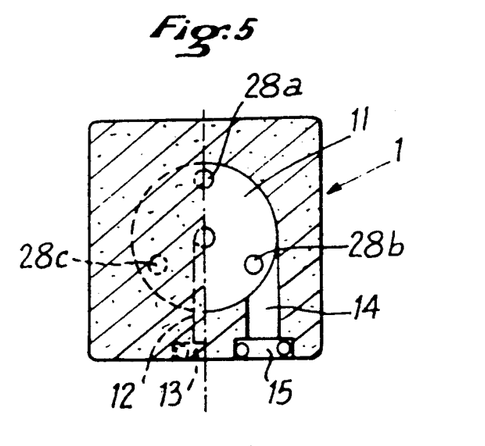
FIG. 5 is a view in cross-section taken along line V—V in FIG. 4.

Reference will now be made to FIGS. 4 and 5 which are diagrammatic views in section of the apparatus 1 according to the invention. The apparatus 1 comprises a body 10, for example of plastic material, having an internal chamber 11 connected by a first duct 12 to a first orifice 13 for connection thereof to the feed line or conduit 3 upstream of the cut-off valve 2, as shown in FIGS. 1 through 3. A second duct 14 which is shown in FIG. 5 connects the chamber 11 to a second orifice 15 for connection thereof to a triggering member (not shown).

It will be seen therefore that the outputted signal is pneumatic in this case and is used directly for pilot-control of the member for triggering off the safety measures, for example the valve 2 in the foregoing figures. It will be seen with reference to FIG. 10 that that signal may be electrical.

A third duct, 16 connects the chamber 11 to an exhaust or discharge orifice 17. It will be noted that the first duct 12 opens into the chamber 11 through a valve seat 18 which is of a markedly smaller diameter than the diameter of the valve seat 19 through which the duct 16 opens into the chamber 11.

A valve member 20 is mounted in the chamber 11 movably between the two seats 18 and 19, that is to say between a first position in which it is applied against the seat 18 and a second position in which it is applied against the seat 19.

The valve member 20 is subjected to the force of a resilient return member 21 which is adjustable and which tends to urge the valve member 20 into its first position of bearing against the seat 18. The return member 21 comprises a coil spring 22 which is interposed between a thrust rod 23 for co-operating with the valve member 20 and the screw member 24 of a nut-screw system, the nut 25 of which is fixed in the body 10, to permit the calibration of the spring 22 to be adjusted. A locking nut 26 permits the screw member 24 to be locked after adjustment of the spring force.

In opposite relationship to the member 21 with respect to the valve member 20, the apparatus further comprises a re-arming or re-setting member 27 comprising a thrust member 28 which in this case is formed by three bar portions 28a, 28b and 28c disposed slidably in the body 10 between the valve member 20 and an actuating member which is operable from the exterior of the body 10 and which in this case is represented in the form of a pushbutton 29 mounted slidably in the body 10 against the force of a return spring 30 which tends to cause it to project out of the body 10.

The above-described apparatus operates in the following manner. First of all, calibration of the spring 22 is adjusted, to define the pressure threshold for triggering or switching of the apparatus.

In operation, the pressure of the system, being the conduit portion 3a of the feed line, obtains in the duct 12. The valve member 20 is held against the seat 19 by a force equal to the pressure in the system, multiplied by the useful surface area of the seat 19. That force is markedly greater than the force of the spring 22. With the valve member 20 in that position, the duct 16 does not communicate with the chamber 11 while the duct 14 communicates with the chamber 11 and therefore with the duct 12. The pressure in the system is therefore transmitted to the pilot-control chamber of the valve 2 which is held in its position of opening the conduit 3.

If the pressure in the system falls below the triggering threshold, the force of the spring 22 applied to the valve member 20 becomes preponderant and the valve member 20 is displaced towards the seat 18. The duct 12 is then closed off while the duct 16 and therefore the pilot-control chamber of the valve 2 is communicated with the exhaust. The valve 2 which is a mono-stable device therefore goes into its position of interrupting the conduit 3, with the downstream conduit portion 3b being communicated with the exhaust.

If the pressure in the system spontaneously returns to a value which is higher than that at which the apparatus was triggered, the force which is applied to the valve member 20 in the condition of bearing against the seat 18, by virtue of that pressure, is less than that of the spring as the operative surface area of that seat is very small and is calculated in consequence. The apparatus does not therefore experience a change in state. To produce a change in state, it is therefore necessary to perform a voluntary and deliberate action which involves depressing the pushbutton 29 in order, by way of the thrust member 28, to move the valve member 20 from the seat 18 to the seat 19 against which it will remain applied if the pressure in the duct 12 is again re-established at a level higher than the triggering threshold, since then it will be applied to the operative surface area of the seat 19, which is much greater than the operative surface area of the seat 18.

The re-established pressure can again be applied to the pilot-control member of the valve 2 which will return to its position of opening the line or conduit 3.

Figure 6:
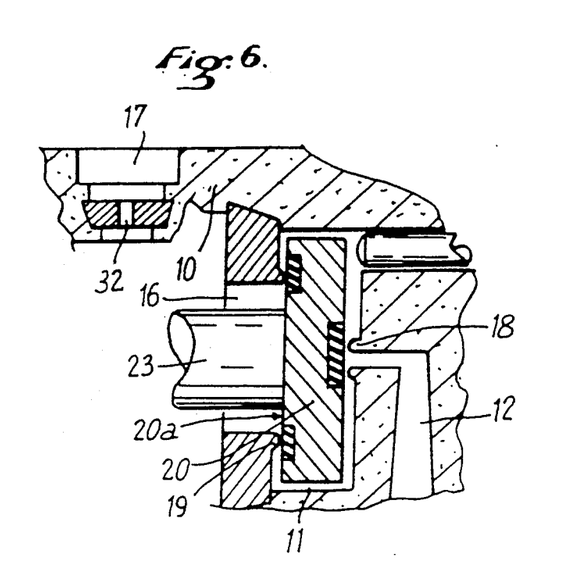
FIG. 6 shows a structural detail of the invention.

In order for operation of this apparatus to be reliable, it is necessary to protect it from spurious switching movements at the moment of triggering of the arrangement, that is to say conditions under which the valve member 20 is in an unstable situation intermediate between the two seats 18 and 19 because of a flow of air which is established between those seats in the chamber 11, giving rise to cushions of air which brake the movement of the valve member or prevent it from being applied against the valve seats, or giving rise to conditions under which the valve member can oscillate. The switching movement must therefore be an abrupt and certain movement. To achieve that, referring now to FIG. 6, illustrated therein is a detail from FIG. 4, comprising a means for creating a force for assisting the movement of the valve member. This involves the exhaust back pressure which is going to be established in the duct 16 by virtue of the positioning of a restriction 32 in the duct 16, in this case in the purge orifice 17. In fact, when the valve member 20 is moved away from the seat 19, the fluid which reaches the duct 16 is restrained in terms of its flow by the restriction 32 and an exhaust back pressure is generated, the effect of which on the face 20a of the valve member 20 is added to that of the spring 22, to promote an abrupt switching movement. That restriction may be provided anywhere on the duct 16 and in particular around the thrust rod 23 for the valve member 20.

Figure 7:
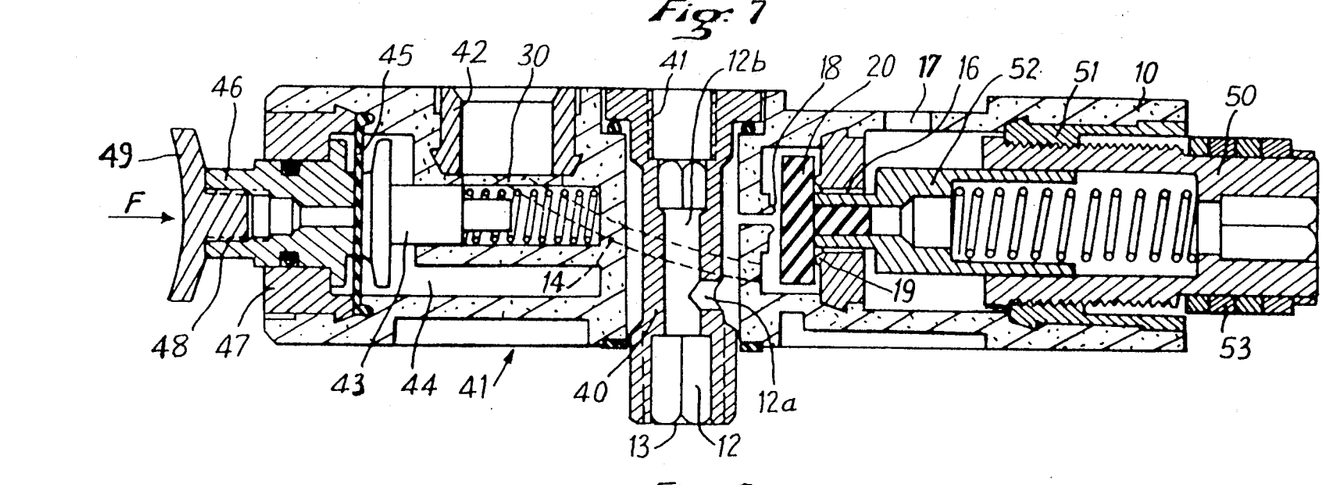
FIGS. 7 and 8 show a second embodiment of the invention.
Figure 8:
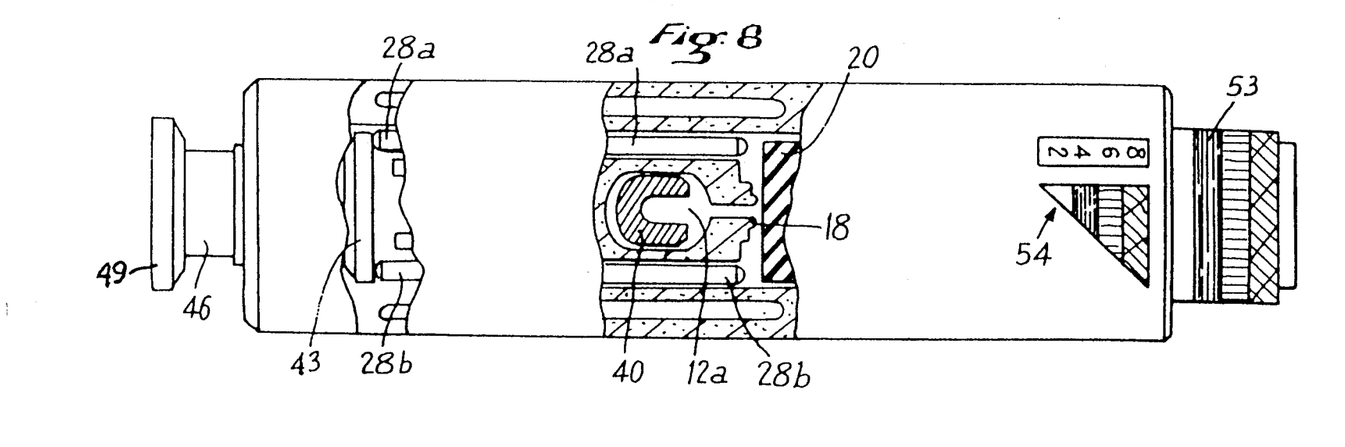

Referring now to FIGS. 7 and 8, the embodiment of the apparatus illustrated therein again comprises the same base components as those described with reference to FIGS. 4 and 5. It is only the general architecture and configuration that is different. Thus, the duct 12 is provided in an insert 40 for installation of the apparatus in for example any screw-threaded orifice in which the pressure to be monitored obtains.

The fixing insert 40 also constitutes a support for the connection of a manometer for indicating the input pressure. For that purpose the duct 12 is divided into a duct branch 12a which leads to the seat 18 and a duct branch 12b which is coaxial with the insert 40, leading to the orifice 41 for fitting the manometer. The attraction of that arrangement will be described hereinafter with reference to FIG. 11.

The duct 14 is only indicated symbolically in FIG. 7. In actual fact it is formed by communications provided by injection molding between the chamber 11 and an insert 42 which bears the outlet orifice 15.

The thrust member 28 of the re-arming or re-setting arrangement, as in the above-described construction, comprises slidable bar portions 28a and 28b and a portion 43 which slides in the body 10 against the force of a spring 30. The portion 43 which is in contact with the bar portions 28a and 28b is slidable in a housing 44 in the body, which is closed by a deformable diaphragm 45. The part of the housing 44 which is disposed on the other side of the diaphragm 45 receives a pushbutton 46 which, by a force applied thereto as indicated by the arrow F, can bear against the diaphragm 45 to actuate the thrust member 28. The pushbutton 46 in this embodiment is sealingly slidable in the body, or ore specifically in an insert 47 which is anchored in the body, and comprises a screw-threaded orifice 48 which can selectively receive the pushbutton 49 in the true sense for manual actuation of the re-arming or re-setting thrust member 28, or a connecting member (not shown) for connecting a conduit for supplying a pneumatic pressure, thus making it possible to provide for remotely controlled re-setting by means of a pneumatic signal. By virtue of the presence of the diaphragm 45 and the sealing effect as between the body and the pushbutton 46, the pneumatic pressure makes it possible to displace the portion 43 and the bar portions 28a and 28b to move the valve member 20 away from its seat 18. That embodiment therefore makes it possible to provide two types of apparatus, namely an apparatus with direct manual re-setting or an apparatus with remotely controlled re-setting.

In regard to the part of the apparatus in which the member for adjusting the triggering threshold is disposed, it will be noted that there are some structural differences, in comparison with the preceding embodiment. Thus, the spring 22 is compressed by a hollow screw member 50 which is screwed into a nut 51 anchored in the body 10, against the valve member 20 which has a hollow shank portion 52.

The screw member 50 can therefore be screwed into the body to a greater or lesser extent, the part thereof which remains projecting out of the body and therefore visible constituting an indication of the degree of calibration of the spring and therefore the adjusted value of the triggering threshold. In order to provide for approximate quantification of that value, the screw member 50 may be provided with a stack of rings 53 thereon, of different colors, while a correspondence between the colors which remain visible on the screw ember 50 and a scale of triggering threshold values may be printed on the body or marked in any other manner thereon, as indicated at 54.

Figure 9:
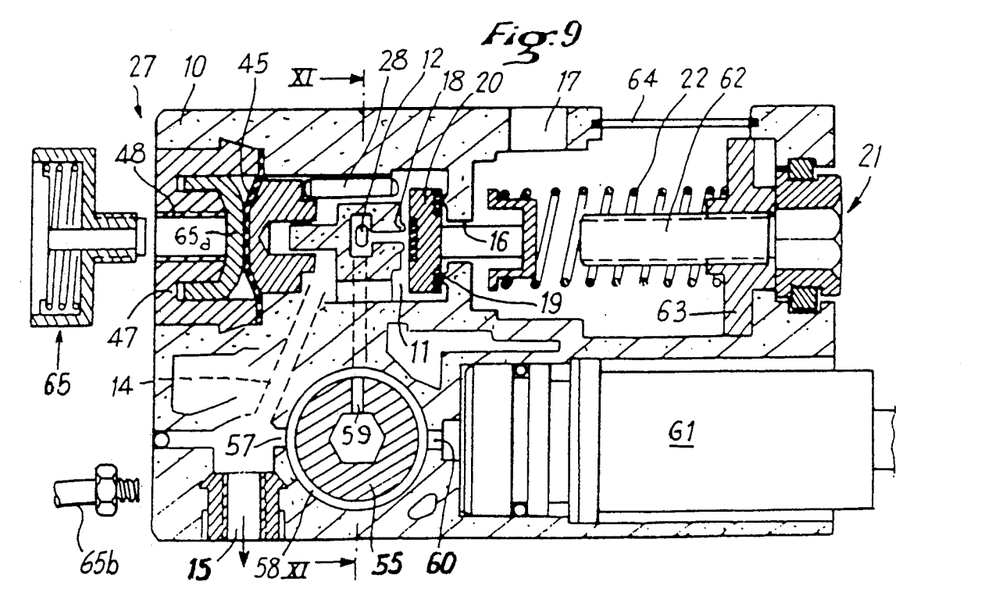
FIGS. 9 and 10 show an embodiment which is more compact than that shown in FIGS. 7 and 8, FIG. 10 being a view in section taken along line IX—IX in FIG. 9.
Figure 10:
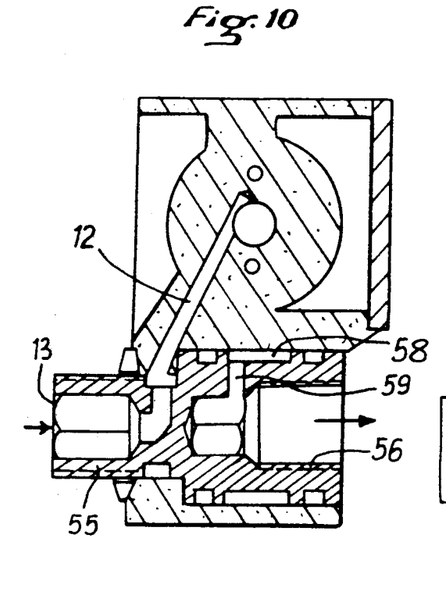

Reference is now made to FIGS. 9 and 10 showing another embodiment of the invention. Most of the components which have already been described are also to be found in FIGS. 9 and 10, with the same references. The duct 12 is connected to the part of the feed conduit upstream of the cut-off valve by way of a connection 55 of the same type as that indicated at 40 in FIG. 7, which also has a screw-threaded orifice 56 for the installation of a manometer for monitoring the pressure in the second duct 14 of the apparatus, that is to say that which generates the signal for pilot-control of the valve 2. The orifice 56 is connected to the duct 14 by a branch duct portion 57 which extends from the duct 14 and which terminates in line with a groove 58 in the connection 55, which communicates with the orifice 56 by way of a radial hole 59. An extension portion 60 of the branch duct portion 57 permits that output pressure to be passed to the input of a sensor device 61 which is operable to output an electrical signal, for example in the presence of a pressure in the duct 14.

This embodiment is an attractive one from a practical point of view as it permits adaptation to all situations of use. Indeed, if the receiver of the signal involves pneumatic pilot control, it is the output 15 which will be used. If the signal receiver involves electrical control, it is the output signal of the sensor device 61 which will be employed. The orifice 15 can then be simply closed off. If finally the installation is a complex one and if the safety procedure requires the two types of information, the manostatic relay can provide same for the members which are to deal with that procedure.

As regards regulating the triggering threshold, it will be seen that in this embodiment compression of the spring is regulated by a screw 62 which is rotatable in the body 10 and which thus axially entrains a nut 63 which is prevented from rotating in the body, for example by virtue of a polygonal contour. The nut 63 may itself constitute an index for indicating the setting of the triggering threshold, relative to a graduation carried by the edges of a window 64 provided in the body 10, through which the nut 63 can be viewed.

In regard to the re-arming or re-setting member 27, it will be noted that the arrangement includes a cup member 65a which permits distribution of the force applied by the shank portion of the pushbutton 65, being of small section, which will be mounted in the screw-threaded orifice 48 which is also capable of receiving the end of a pneumatic pilot-control conduit 65a, as shown in FIG. 9.

Figure 11:
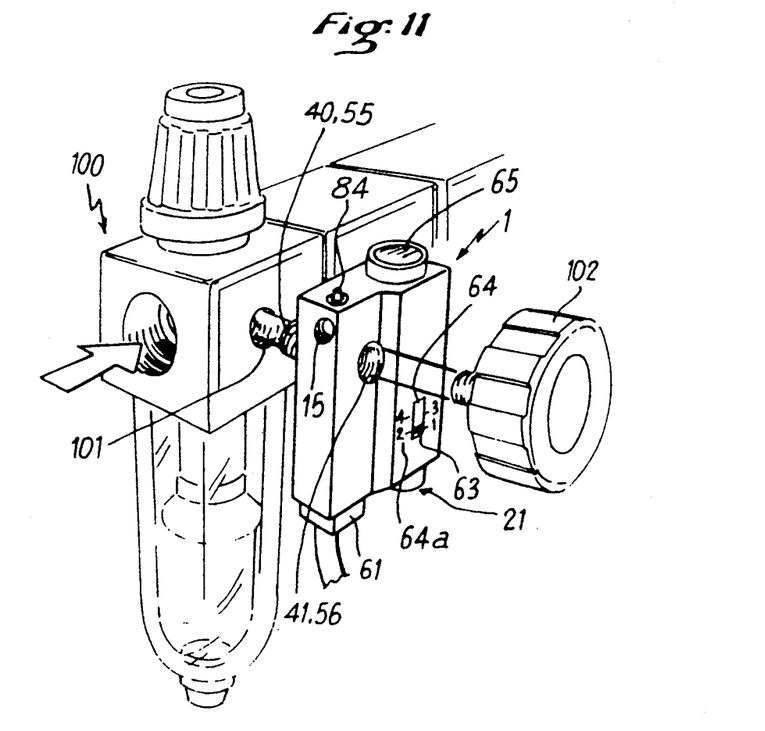
FIG. 11 shows an advantageous mode of installation of the relay according to the invention.

FIG. 11 illustrates a manner of fitting the apparatus according to the invention, which amongst other advantages permits integration thereof into the usual installations, without falling foul of or violating the normal practices. FIG. 11 indicates the advantages of the connecting member 40 and 55 described with reference to FIGS. 7 and 9.

The fine lines in FIG. 11 show members 100 which are conventionally to be found at the intake of a pneumatic power installation which for example supplies a machine. The illustrated assembly involves components which provide for expansion of the compressed air, filtration and lubrication thereof. In most cases, those components have an orifice 101 for the installation of a front manometer for indicating the feed pressure for the installation from the output of the pressure-reducing unit. It will be appreciated that, by virtue of the connection 40 or 55, it is possible to install the relay apparatus according to the invention in the screw-threaded orifice which is conventionally intended to receive the manometer, and to fit the manometer as indicated at 102 to the relay apparatus so that, from the point of view of the user, the manometer 102 appears at the location at which the user is accustomed to see it. The manometer 102 will give the usual information if it is the connection 40 which is used. It will supply information relating to the state of the relay apparatus if it is the connection 55 which is used.

When using the connection 40, it will be preferable to fit an indicator 84, being a projecting index member or light-emitting diode which is lit if there is a pressure in the second duct 14. FIG. 11 also shows the pneumatic outlet orifice 15 which may be closed off or connected to a pilot-control conduit, the output of the electrical sensor device 61, the window 64 for displaying the index nut 63 with its scale 64a, and the manual control button 65.

Figure 12:
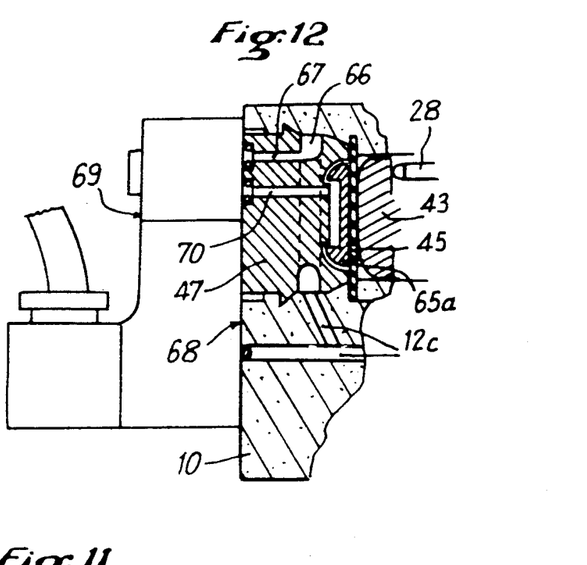
FIG. 12 shows an electrically operated valve for actuating the re-arming member by way of a pneumatic fluid.

FIG. 12 shows an alternative embodiment which is primarily intended for electrically operated re-arming or re-setting, that is to say, provided on the body 10 is a mounting surface 68 for an electrically operated valve 69. The mounting surface 68 is carried by a connecting insert 47 and has a pressure inlet 67 connected by a groove 66 to a branch portion 12c of the duct 12 and a duct 70 which goes to a cavity containing a cup member 65a and a diaphragm 45. The electrically operated valve 69 provides for communications and disconnections as between the ducts 67 and 70 in known manner.

In an alternative form of the FIG. 12 construction, the electrically operated valve may be replaced by a manually operated gate-type device or control valve.

Figure 13:
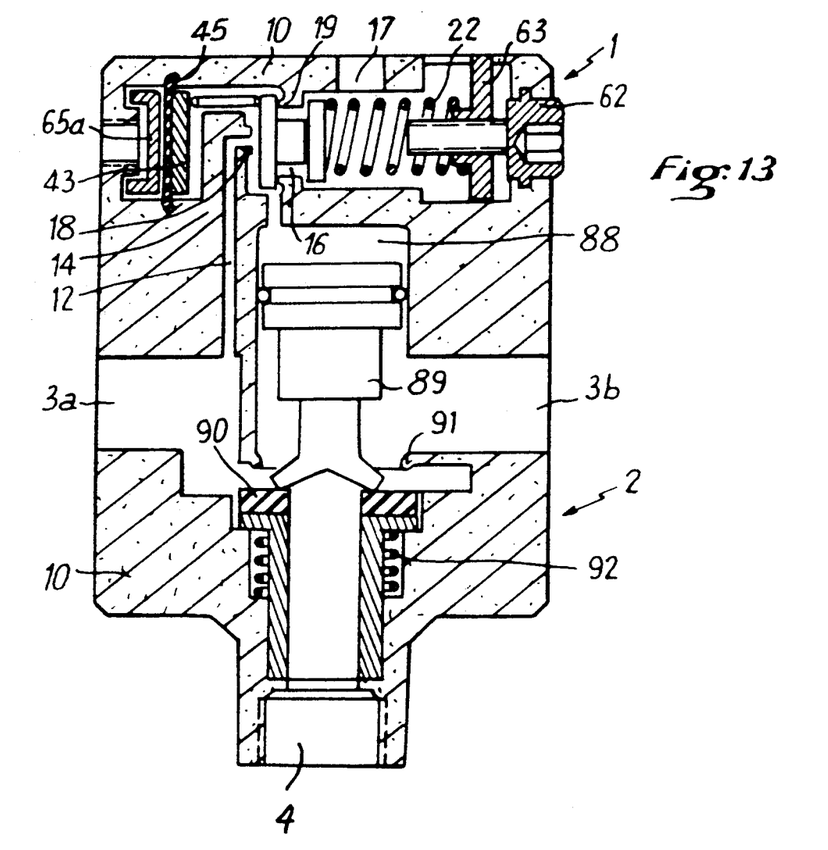
FIG. 13 shows the apparatus incorporated into the body of a cut-off valve with an adjustable triggering threshold.

Referring now to FIG. 13, shown therein is a monostable disconnection or cut-off valve 2 having three ways and two positions, with a triggering threshold and voluntary re-arming or re-setting. The FIG. 13 valve again comprises, in the same body 10, the arrangement shown in the preceding figures, in association with the components of the valve. Thus, the duct 14 opens into a chamber 88 for pilot-control of a piston 89 which acts on a valve member 90 in the direction of moving it away from its seat 91 to establish and maintain a communication between the conduit portions 3a and 3b of the conduit 3, and to isolate those conduit portions from the purge orifice 4. The piston 89 acts against the force of a spring 92 which tends to return the valve member 90 to its position of bearing against its seat 91 and in that position to isolate the conduit portion 3a from the conduit 3b while communicating the latter with the purge orifice 4.

A pressure in the duct 14 implies opening of the valve while an absence of pressure in the duct 14, which is communicated with the exhaust 17, implies closure of the valve and purging of the installation at a downstream location.

It will be appreciated that the above-described constructions have been set forth by way of example and illustration of the principles of the present invention and that various other modifications and alterations may be made therein without thereby departing from the spirit and scope of the invention.

What is claimed is:

1. An apparatus with a re-setting action, for producing a signal for triggering off at least one safety measure on an installation including at least a pneumatic feed in the event of a drop in the pressure of said pneumatic feed, comprising:

a body having a first orifice for connection to the pneumatic feed;

an internal chamber in the body;

a first duct in the body communicating the first orifice with the chamber;

a second duct communicating with said chamber;

means connected to the chamber for establishing a signal in a first state when the pressure, of the feed is higher than a threshold and in a second state when said pressure falls below said threshold, the signal in its first state being the presence of a pressure in the second duct and in its second state being the absence of pressure in the second duct, the means for establishing the signal comprising: a first seat through which the first duct opens into the chamber; a third duct communicating the chamber with an exhaust orifice of the body; a second seat through which the third duct opens into the chamber, the second seat being of larger diameter than the first seat; a valve member movable in the chamber between a first position in which it is applied against the first seat and a second position in which it is applied against the second seat; and a resilient return member operatively disposed between the body and the valve member to urge the valve member towards its first position under a force of an intensity corresponding to said threshold;

means for regulating the value of said threshold; and a voluntary re-setting means comprising an actuating member which is accessible from the exterior of the body, and a thrust means disposed in opposite operative relationship to the resilient return member with respect to the valve member between the latter and the actuating member, the thrust means being displaceable in said body with a movement of an amplitude which is at least equal to the value of the displacement of the valve member when it moves from one of the seats to the other.

2. Apparatus as set forth in claim 1 and further comprising a means for producing said triggering signal including an orifice for connection of a connecting conduit of said second duct to a member for triggering off said safety measure.

3. Apparatus as set forth in claim 2 wherein said first orifice is in the form of a connector which comprises a secondary orifice for fitting a manometer which is coaxial with and opposite to the first orifice.

4. Apparatus as set forth in claim 3 wherein the secondary orifice communicates with the second duct.

5. Apparatus as set forth in claim 3 wherein the secondary orifice communicates with the first duct.

6. Apparatus as set forth in claim 2 wherein said member for triggering off said safety measure being a disconnection valve, the body is formed by the body of the valve.

7. Apparatus as set forth in claim 1 and further comprising a means for producing said triggering signal including a sensor responsive to the pressure obtaining in the second duct and adapted to output an electrical signal in the presence of said pressure towards a member for triggering off said safety measure.

8. Apparatus as set forth in claim 1 and further including a means for assistance of the force applied by the resilient return member to the valve member when it moves from its second position towards its first position, said assistance means including a restriction means in the third duct and adapted to generate an exhaust back pressure.

9. Apparatus as set forth in claim 1 wherein the actuating means comprises a manual-actuation pushbutton slidably disposed in the body.

10. Apparatus as set forth in claim 1 wherein the actuating means includes a pilot-control conduit connected to the body for applying a pneumatic fluid under pressure to the face of a deformable diaphragm sealingly accommodated in a housing in the body and disposed between the thrust means and the connecting means of the pilot-control conduit, and a support cup member slidably disposed in the housing for the diaphragm on the side of the diaphragm which is remote from the thrust means.

11. Apparatus as set forth in claim 10 wherein said pilot-control conduit comprises a first section formed by a branch from the first duct, and a second section which goes to the housing for the diaphragm on the side of said diaphragm which is remote from said thrust means, and further including a normally closed valve for communicating the first and second sections, the valve being mounted to the body of the apparatus at a mounting surface at which said first section terminates and from which said second section starts.

12. Apparatus as set forth in claim 1 wherein the resilient return member comprises an adjustably calibratable spring having a first end adapted to bear against the valve member, and a second end, and further including a screw-nut system of which one element is fixed with respect to the body and the other element is movable in respect of translatory movement with respect to the one element, the screw of said system being accessible from the exterior of the body to be actuated with a rotary movement and the second end of the spring being adapted to bear against the movable element of the screw-nut system.

13. Apparatus as set forth in claim 12 wherein said nut of said screw-nut system constitutes said movable element which is movable in respect of translatory movement with respect to the screw and the body, and constitutes an index for marking the sing calibration value, being displaceable with respect to the body, the body having an outside surface portion comprising a graduation with respect to which the index is displaceable upon adjustment of the spring calibration.

* * * * *